(12) United States Patent
Cleveland et al.

(10) Patent No.: US 7,397,671 B2
(45) Date of Patent: Jul. 8, 2008

(54) LOW PROFILE AUTODOCKING MULTI-BATTERY PACK SYSTEM AND IN PLACE SERVICE PCI STORAGE CONTROLLER CARD WITH REDUNDANT CACHE AND CONCURRENTLY MAINTAINABLE REDUNDANT BATTERY BACKUP

(75) Inventors: Lee Dale Cleveland, West Concord, MN (US); Eric Alan Eckberg, Rochester, MN (US); Jeffery James Gathje, Rochester, MN (US); Michael Scott Good, Fountain, MN (US); Herbert Jorgen Jensen, Byron, MN (US); Mark David Pfeifer, Rochester, MN (US); John Allan Skurdalsvold, Byron, MN (US)

(73) Assignee: International Business Machines Corporation, Armonk, NY (US)

( * ) Notice: Subject to any disclaimer, the term of this patent is extended or adjusted under 35 U.S.C. 154(b) by 466 days.

(21) Appl. No.: 11/239,599

(22) Filed: Sep. 29, 2005

(65) Prior Publication Data

US 2007/0070610 A1 Mar. 29, 2007

(51) Int. Cl.
*H05K 5/00* (2006.01)

(52) U.S. Cl. .......... 361/756; 361/686; 361/683
(58) Field of Classification Search ................. 361/683, 361/686, 756, 679; 312/223.2, 223.1; 710/110, 710/107, 100
See application file for complete search history.

(56) References Cited

U.S. PATENT DOCUMENTS

| 6,228,528 | B1 * | 5/2001 | Burkholder et al. | 429/163 |
| 6,850,409 | B1 * | 2/2005 | Triebes et al. | 361/684 |
| 2002/0080541 | A1 * | 6/2002 | Bunker et al. | 361/72 |

\* cited by examiner

*Primary Examiner*—Hung S Bui
(74) *Attorney, Agent, or Firm*—Joan Pennington

(57) ABSTRACT

A low profile auto docking multi-battery pack system and an in place service PCI storage controller card system with redundant cache and concurrently maintainable redundant battery backup are provided. A first battery and a second battery are disposed in line to provide a low profile battery pack. The first battery and second battery are shrink-wrapped together inside a frame and are slideably removable through an opening in a PCI tailstock and are hot swappable. The PCI storage controller card system is defined by a two card assembly that includes an internal connector, such as a SCSI connector to connect the two cards together.

17 Claims, 3 Drawing Sheets

PRIOR ART

LOW PROFILE AUTODOCKING MULTI-BATTERY PACK SYSTEM AND IN PLACE SERVICE PCI STORAGE CONTROLLER CARD WITH REDUNDANT CACHE AND CONCURRENTLY MAINTAINABLE REDUNDANT BATTERY BACKUP

FIELD OF THE INVENTION

The present invention relates generally to the data processing field, and more particularly, relates to a low profile auto docking multi-battery pack system and an in place service PCI storage controller card with redundant cache and concurrently maintainable redundant battery backup.

DESCRIPTION OF THE RELATED ART

Peripheral component interface (PCI) printed circuit cards were originally designed for use with personal computers. An extensive number of applications are implemented on PCI cards utilizing industry standard packaging specifications.

Typically a PCI storage controller card uses a battery to back up the data cache. Eventually the battery must be replaced in the field. To simplify field replacement, it is beneficial to have the battery removable through the tailstock of a PCI card. Further customers have requested redundant batteries.

FIG. 1 shows such a prior .art battery and connector system that fits through the tailstock of a PCI card. As shown in FIG. 1, the conventional battery and connector system are so large, that only one fits through the tailstock of a PCI card. A need exists for redundant batteries for many applications, such as PCI storage controller cards.

SUMMARY OF THE INVENTION

Principal aspects of the present invention are to provide a low profile auto docking multi-battery pack system and in place service PCI storage controller card with redundant cache and concurrently maintainable redundant battery backup. Other important aspects of the present invention are to provide such low profile auto docking multi-battery pack system and in place service PCI storage controller card with redundant cache and concurrently maintainable redundant battery backup substantially without negative effect and that overcome many of the disadvantages of prior art arrangements.

In brief, a low profile multi-battery pack system is provided. A first battery and a second battery are disposed in line to provide a low profile battery pack. The first battery and second battery are shrink-wrapped together inside a frame and are slideably removable through an opening in a PCI tailstock and are hot swappable.

In accordance with features of the invention, the frame carries a pair of auto docking connectors for mating to a connector on a printed circuit board. The auto docking connectors are connected to the batteries. The frame includes a pair of spacer ribs extending inwardly from opposed frame sidewalls between the batteries to locate the batteries between the PCI tailstock and an opposite frame end wall. The frame includes keying features for positioning the battery pack. A pair of rails engages the keying features to locate and guide the battery pack during installation.

In accordance with features of the invention, the frame includes a front wall to secure the battery pack to the PCI tailstock. An electromagnetic compatibility (EMC) shielding foam provides an EMC seal between the PCI tailstock and the frame front wall. The frame front wall includes a plurality of openings to allow airflow over the first battery and second battery.

An in place service PCI storage controller card system with redundant cache and concurrently maintainable redundant battery backup is provided. A two card assembly defining the in place service PCI storage controller card system includes an internal connector, such as a SCSI connector to connect the two cards together. One of the cards includes the low profile multi-battery pack system and a redundant cache memory. The other card includes a plurality of connectors, such as SCSI connectors extending through the PCI tailstock.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In accordance with features of the preferred embodiments, an alternate packaging and connector system allow two batteries and connectors to be removed through the tailstock, in a way that simplifies maintenance, such as auto docking, and provides the function of a second battery that can be serviced through the tailstock.

In accordance with features of the preferred embodiments, two independent battery cells are shrink wrapped together inside a simple plastic frame. This creates a stiff structure without adding any thickness, which allows the battery pack to slide out through an opening of a PCI tailstock.

Figure 1:
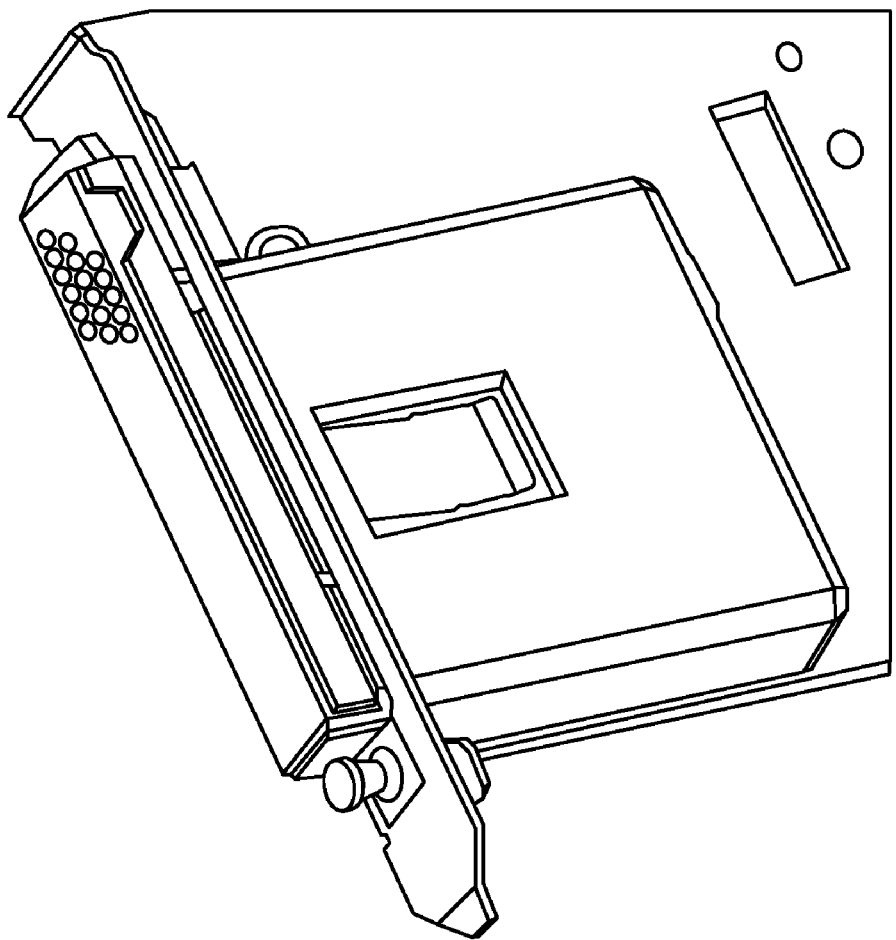
FIG. 1 illustrates a prior art PCI battery and connector system.
Figure 2:
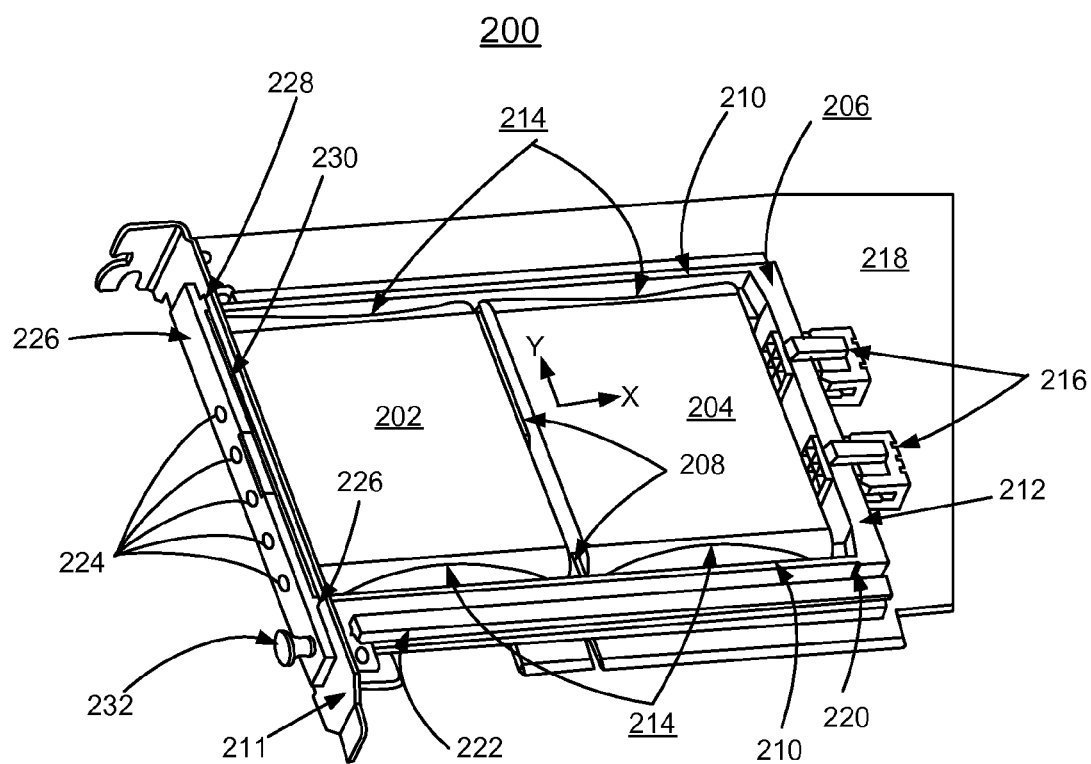
FIG. 2 is a perspective view illustrating not to scale a low profile auto docking multi-battery pack PCI card system in accordance with the preferred embodiment.

Having reference now to the drawings, in FIG. 2, there is shown a low profile auto docking multi-battery pack PCI card system generally designated by the reference character 200 in accordance with the preferred embodiment. The multi-battery pack PCI card system 200 includes a first battery 202 and a second battery 204. The batteries 202, 204 are shrink-wrapped together inside a frame generally designated by the reference character 206.

Frame 206 includes a pair of spacer ribs 208 extending inwardly from opposed frame sidewalls 210 between the batteries 202, 204 to locate the batteries between a tailstock 211 and an opposite frame end wall 212 indicated by an arrow labeled X in an X-direction. The spacer ribs 208 are not connected together in a Y-direction indicated by an arrow labeled Y allowing a shrink-wrap generally designated by the reference character 214 to squeeze frame 206 to the batteries 202, 204.

Frame 206 holds a pair of auto docking connectors 216, which have a slight amount of float to allow the auto docking connectors 216 for mating to a connector (not shown) on a printed circuit board 218. The auto docking connectors 216 have a low profile and simplify installation of PCI card system 200 into various computer and server systems.

The auto docking connectors 216 are connected with wires to the batteries 202, 204. Wiring channels are provided within the frame 206. It should be understood that the present invention is not limited to such wire connections, for example, another option is to make the side rails from an electrically conductive material, such that the right and left rails terminated to the sides of the batteries, then docked into connectors 216 on the board 218. This conductive rail option would eliminate the cabling and floating connectors 216 and provide for a simpler options for the plastic frame, possibly eliminating it entirely.

Frame 206 provides a pair of keying features or tabs generally designated by the reference character 220 arranged so that the battery pack cannot be inserted incorrectly. Keying tabs 220 optionally can be used to engage a respective one of two plastic rails 222 that locate and guide the battery pack during system installation.

Once the batteries 202, 204 contained within frame 206 enters through an opening in the PCI tailstock 211, the batteries 202, 204 and frame 206 can be lifted off the board 218 using the keying tabs 220 or ears 220 on the frame sidewalls 210 or side rails 210. This allows small surface mount components to reside under the connector end of the battery adjacent the auto docking connectors 216, if this space is needed.

Frame 206 includes a plurality of holes 224 in a front wall 226 to allow for an alternate air exit from the multi-battery pack PCI card system 200. Frame 206 includes a pair of front ears 228 that are used to secure the pack to the tailstock 211. An electromagnetic compatibility (EMC) shielding foam 230 provides an EMC seal between the PCI tailstock 211 and the front wall 226. The EMC foam seal 230 replaces two sheet metal pieces from prior art arrangement. A knob 232 is carried on the front wall 226 used in removing the multi-battery pack PCI card system 200.

Frame 206 is formed, for example, of a plastic material or other electrically non-conductive material having sufficient strength to retain the batteries 202, 204. The plastic frame rails 210 guide and retain the battery pack. By not covering the batteries 202, 204, the rails allow for maximum cooling air to flow past the batteries, and critical height in the thickness direction of the battery pack is not consumed.

Frame 206 has simple features to help retain the battery pack, such that the shrink wrap 214 only squeezes the frame 206 to the batteries 202, 204, and then the frame can handle most of the retention forces. The plastic frame 206 and shrink-wrap process 214 are generally low cost to implement.

Figure 3:
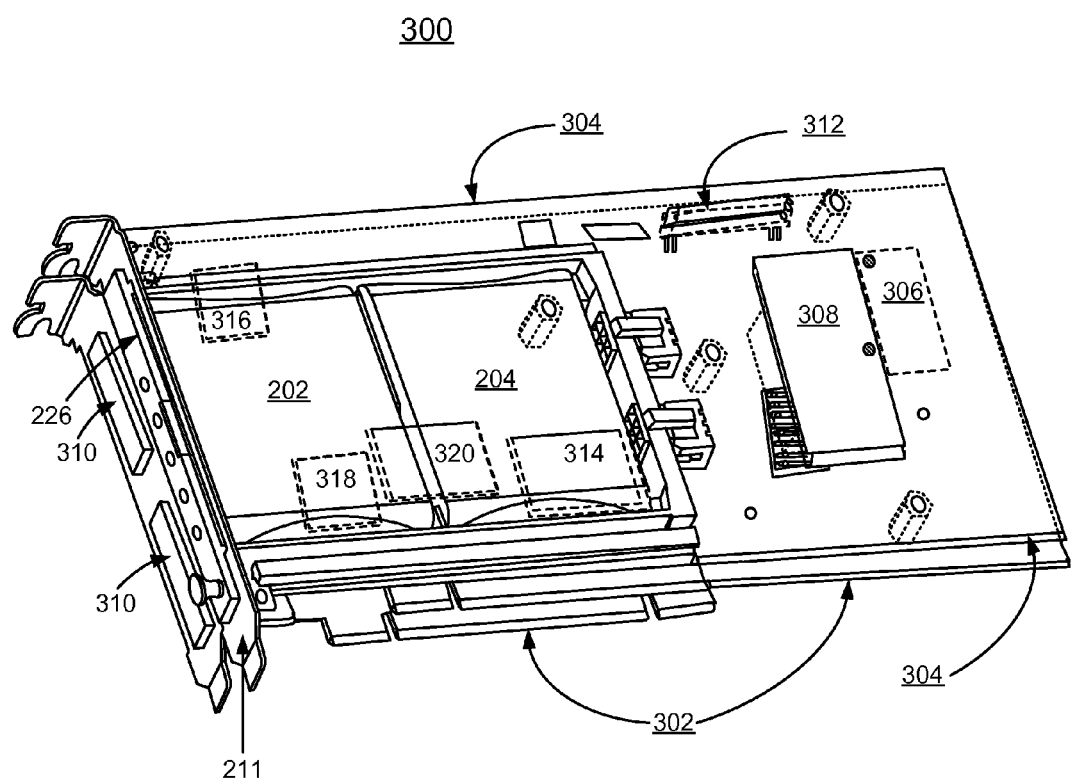
FIG. 3 is a perspective view illustrating not to scale an in place service PCI storage controller card system with redundant cache and concurrently maintainable redundant battery backup in accordance with the preferred embodiment.

Referring now to FIG. 3, there is shown an exemplary in place service PCI storage controller card system with redundant cache and concurrently maintainable redundant battery backup generally designated by the reference character 300 in accordance with the preferred embodiment.

In FIG. 3, the same reference numbers are used for similar or identical components of the PCI storage controller card system 300 as used for the multi-battery pack PCI card system 200 of FIG. 2.

In accordance with features of the preferred embodiments, PCI storage controller card system 300 includes two cards, a main card 302 and a daughter card 304. The main card 302 and the daughter card 304 are received within a respective PCI card slot. In FIG. 3, selected interior detail of system 300 or components of the main card 302 disposed below the daughter card 304 are illustrated in dotted line. PCI storage controller card system 300 includes a redundant cache arrangement, such as, one cache memory 306 on the main card 302 and one cache memory 308 on the daughter card 304. For example, each cache memory 306, 308 can be provided with a respective nonvolatile (NV) RAM card of the main card 302 and the daughter card 304.

In accordance with features of the preferred embodiments, PCI storage controller card system 300 includes hot swappable batteries 202, 204. PCI storage controller card system 300 includes a plurality of external SCSI cable connections 310 for the customer, while no external cable is required to enable the redundant cache 306, 308. A pair of internal SCSI mating connectors 312 advantageously is used to connect together the main and daughter cards 302, 304. The internal SCSI connectors 312 provide for a low cost connection, while using minimal card real estate of the main and daughter cards 302, 304.

Main card 302 is a base storage adaptor card that has three external SCSI connectors provided by dual SCSI connectors 310. Main card 302 further includes a plurality of modules 314, 316, 318, 320 including for example, a single chip A-series mainframe processor (SCAMP) storage controller module, a power PC module, and a pair of PCI bus modules.

Daughter card 304 includes the batteries 202, 204 that support cache redundancy, and are hot swappable for early life failure or maintenance action with the batteries stacked in line to slide out the single opening in the tailstock 211. Daughter card 304 includes the internal SCSI connector 312 to receive the SCSI cable from the main card 302 or mate with the SCSI connector 312 on the main card 302, a PCI bus module, and the NV RAM card carrying the redundant cache memory 308, such as a 512 MB cache memory.

In brief summary in accordance with features of the preferred embodiments, PCI storage controller card system 300 defined by the two card assembly advantageously is arranged in a blind swap cassette, for example, for In Place Service, with no cabling done after the installation. PCI storage controller card system 300 eliminates the need for any external jumper cable. System performance is also increased with the power budget for two PCI slots that can be used to maximize the storage controller processor performance. Also the dual battery pack 202, 204 can slide out the tailstock 211 providing a hot swappable in place service for early life failure or maintenance action when the batteries need to be replaced.

While the present invention has been described with reference to the details of the embodiments of the invention shown in the drawing, these details are not intended to limit the scope of the invention as claimed in the appended claims.

What is claimed is:

1. A low profile multi-battery pack system comprising: a first battery; a second battery;
    said first battery and said second battery being disposed in line to provide a low profile battery pack;
    said first battery and said second battery being shrink-wrapped together inside a frame and being slideably removable through an opening in a peripheral component interface (PCI) tailstock and said first battery and second battery being hot swappable;
    said frame carries one or more auto docking connectors for mating to a connector on a printed circuit board;
    said auto docking connectors are connected to said first battery and said second battery.

2. A low profile auto docking multi-battery pack system as recited in claim 1 wherein said frame includes a front wall being secured to the PCI tailstock.

3. A low profile auto docking multi-battery pack system as recited in claim 2 includes an electromagnetic compatibility (EMC) shielding foam provides an EMC seal between said PCI tailstock and said frame front wall.

4. A low profile auto docking multi-battery pack system as recited in claim 1 wherein said frame front wall includes a plurality of openings to allow exhaust airflow for the system.

5. A low profile auto docking multi-battery pack system as recited in claim 1 wherein said frame includes a pair of opposing sidewalls, an end wall and a front wall opposite said end wall; said front wall being secured to said PCI tailstock.

6. A low profile auto docking multi-battery pack system as recited in claim 5 wherein said frame includes a pair of spacer ribs extending inwardly from said opposing frame sidewalls between said first battery and said second battery to locate said first battery and said second battery between said PCI tailstock and said frame end wall.

7. A low profile auto docking multi-battery pack system as recited in claim 5 wherein said frame includes keying features for positioning said first battery and said second battery.

8. A low profile auto docking multi-battery pack system as recited in claim 7 includes a pair of rails engages said keying features to locate and guide said first battery and said second battery during installation.

9. A low profile auto docking multi-battery pack system as recited in claim 1 includes a first printed circuit board; a pair of auto docking connectors for mating to a connector on said first printed circuit board.

10. A low profile auto docking multi-battery pack system as recited in claim 9 includes a second printed circuit board connected to a second PCI tailstock; an internal connector to connect said first and second printed circuit board together.

11. A low profile auto docking multi-battery pack system as recited in claim 10 wherein said second printed circuit board includes a storage controller and a plurality of connectors extending through said second PCI tailstock.

12. A low profile auto docking multi-battery pack system as recited in claim 11 wherein said first printed circuit board and said second printed circuit board include a cache memory.

13. A low profile auto docking multi-battery pack system as recited in claim 9 wherein said first battery and second battery support cache redundancy.

14. A peripheral component interface (PCI) storage controller card system comprising:

a two card assembly including an internal connector to connect the two cards together;

a first card of said two card assembly including a storage controller, a cache memory, and a plurality of connectors extending through a first peripheral component interface (PCI) tailstock;

a second card of said two card assembly including a redundant cache memory, a first battery and a second battery being disposed in line to provide a low profile battery pack, said first battery and said second battery being shrink-wrapped together inside a frame and being slideably removable through an opening in a second peripheral component interface (PCI) tailstock;

said frame carries at least one auto docking connector for mating to a connector on said second printed circuit board; and said auto docking connector connected to said first battery and said second battery.

15. A peripheral component interface (PCI) storage controller card system as recited in claim 14 wherein said frame includes a pair of opposing sidewalls, an end wall and a front wall opposite said end wall; said front wall being secured to said first PCI tailstock.

16. A peripheral component interface (PCI) storage controller card system as recited in claim 15 includes an electromagnetic compatibility (EMC) shielding foam provides an EMC seal between said PCI tailstock and said frame front wall; and said frame front wall includes a plurality of openings to allow airflow over said first battery and said second battery.

17. A peripheral component interface (PCI) storage controller card system as recited in claim 15 wherein said frame includes a pair of spacer ribs extending inwardly from said opposing frame sidewalls between said first battery and said second battery to locate said first battery and said second battery between said PCI tailstock and said frame end wall; and said frame includes keying features for positioning said first battery and said second battery.

* * * * *